United States Patent [19]

Kumasaka et al.

[11] Patent Number: 4,673,912
[45] Date of Patent: Jun. 16, 1987

[54] VEHICLE-MOUNTED TRIGGERING DEVICE AND METHOD OF PREVENTING FALSE MALFUNCTION ALARMS IN SUCH A TRIGGERING DEVICE

[75] Inventors: Toru Kumasaka, Osaka; Koichi Kamiji; Toshikazu Ohya, both of Tochigi, all of Japan

[73] Assignees: NEC Home Electronics Ltd., Osaka; Honda Giken Kogyo Kabushiki Kaisha, Tokyo, both of Japan

[21] Appl. No.: 739,234

[22] Filed: May 30, 1985

[30] Foreign Application Priority Data

May 31, 1984 [JP] Japan ............. 59-81477[U]

[51] Int. Cl.⁴ ............................................. B60Q 1/00
[52] U.S. Cl. ................................. 340/52 R; 340/65; 340/635; 340/665
[58] Field of Search ............ 340/52 R, 52 H, 63, 340/65, 635, 643, 644, 653, 650, 661, 665, 693; 307/10 R; 180/271, 274; 280/734, 735

[56] References Cited

U.S. PATENT DOCUMENTS 3,629,816 12/1971 Gillund ......................... 340/52 H
3,633,159 1/1972 Dillman ......................... 340/52 H
4,220,871 9/1980 Yasui et al. ................... 340/52 H
4,222,030 9/1980 Yasui et al. ................... 340/52 H
4,287,431 9/1981 Yasui et al. ................... 340/52 H Primary Examiner—Donnie L. Crosland
Attorney, Agent, or Firm—Cushman, Darby & Cushman

[57] ABSTRACT

A triggering device and a method of operation which may be used in a vehicle-mounted gas bag protection device, in which a bag fills with gas upon impact of the vehicle. During normal conditions, a small current passes through a detonator associated with the gas generator. This current is supplied by an auxiliary power supply, including a capacitor, which is charged through a diode from a main vehicle battery. When impact occurs, an increased current flows through the detonator to cause gas to be generated. To detect malfunctions, a voltage associated with the detonator is monitored and then alarm is generated when the monitor voltage exceeds a predetermined range. To prevent the generation of false malfunction alarms, the predetermined range is determined with respect to the voltage produced by the auxiliary power supply and not the main battery of the vehicle so that fluctuations in the voltage associated with the main battery of the vehicle do not produce false alarms.

11 Claims, 10 Drawing Figures

FIG. 1
PRIOR ART
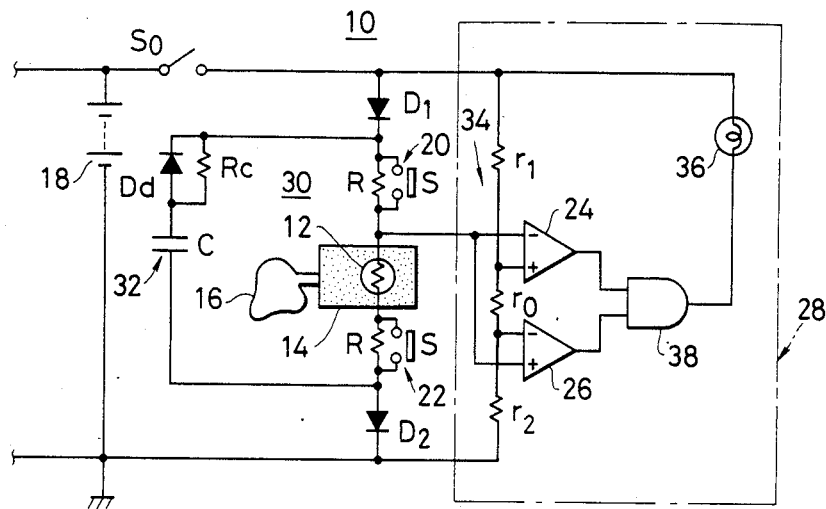
FIG. 2(A)  MAIN PWR. SUPPLY 18 VOLTAGE 
FIG. 2(B)  DETONATOR 12 VOLTAGE 
FIG. 2(C)  COMPARATOR 24 NON-INV. INPUT 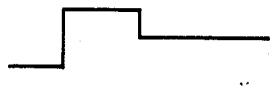
FIG. 2(D)  COMPARATOR 26 INV. INPUT 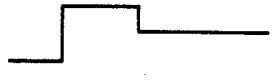
TIME ⟶

FIG. 3
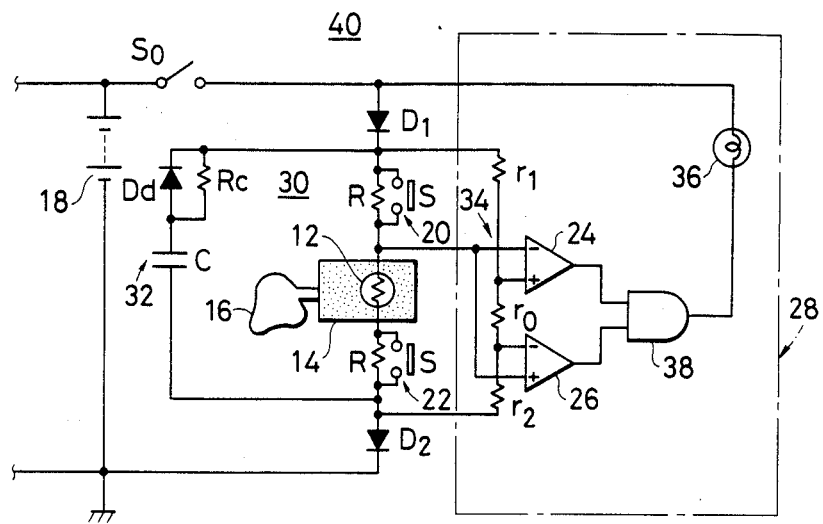
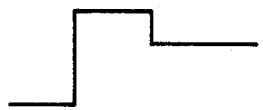
FIG. 4(A)  MAIN PWR SUPPLY 18 VOLTAGE
FIG. 4(B)  DETONATOR 12 VOLTAGE
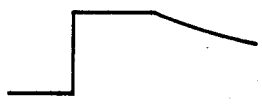
FIG. 4(C)  COMPARATOR 24 NON INV INPUT
FIG. 4(D)  COMPARATOR 26 INV INPUT
TIME ⟶

VEHICLE-MOUNTED TRIGGERING DEVICE AND METHOD OF PREVENTING FALSE MALFUNCTION ALARMS IN SUCH A TRIGGERING DEVICE

BACKGROUND OF THE INVENTION

1. Field of the Invention:

This invention relates to triggering devices mounted in motor vehicles, and more particularly, to such devices which include malfunction alarms.

2. Description of the Prior Art:

There have been proposed passenger cars equipped with passenger protective means in the form of, for example, gas-inflatable bags for protecting passengers in the event of a car crash. Such passenger protective means generally include a gas producing device incorporating a current-activated explosive. The gas producing device is activated by the shock of a car crash to produce the gas, so that the bag is inflated in front of the passenger to prevent the passenger from striking a hard object. Although a detonator known as a squeep, contained in the triggering device, is designated to set off explosives once current exceeding a predetermined value passes through it, it may as well never be installed should the wires connected to it break before a car crash. Accordingly a malfunction detecting circuit has been proposed to detect and warn of any malfunctions in its operation.

FIG. 1 is a schematic circuit configuration illustrating an example of a vehicle-mounted triggering device equipped with the conventional trouble detecting circuit disclosed according to the Japanese Patent Publication No. 23263/83. In vehicle-mounted triggering device 10 shown in FIG. 1, both ends of a detonator 12 within a gas producing device 14, supplied with a bag 16, are connected to a main power supply 18 through detecting means such as impact sensors 20 and 22. Each of sensors 20 and 22 includes a resistor R so that a very small current continuously flows through detonator 12. This current is monitored by comparators 24 and 26 in a trouble detecting circuit 28. The very small current is less than that necessary to ignite detonator 12.

Impact sensors 20 and 22 also include switches S which are closed by the shock of a crash. Switches S are connected in parallel with resistor R. A detonator circuit 30 includes impact sensors 20 and 22, detonator 12 and an auxiliary power supply 32. Auxiliary power supply 32 includes a capacitor C connected in series with the parallel combination of a charge resistor Rc and a discharge diode Dd. The terminals of auxiliary power supply 32 are connected to main power supply 18 through diodes D1 and D2 as unidirectional energizing elements which prevent auxiliary power supply 32 from discharging when the voltage of supply 18 drops as a result of an accidental short across the starter or head lamp wiring, for example. Also, an ignition switch SO is connected between the positive terminal of main power supply 18 and diode D1.

In trouble detecting circuit 28, a divider resistance circuit 34 includes a series circuit having resistors r1 and r2, each having roughly the same resistance as that of resistor R, and a resistor r0 having the same resistance as that of detonator 12. The series circuit is connected across main power supply 18. The voltage between resistors r1 and r0 is applied as a reference input to the non-inverting input terminal of comparator 24, whereas the voltage between resistors r0 and r2 is applied as a reference input to the inverting input terminal of comparator 26. The terminal voltage of detonator 12 is applied to both comparators 24 and 26 as a comparison input. An alarm lamp 36, which lights when trouble is detected, is connected between main power supply 18 and the output terminal of an AND gate circuit 38 receiving the outputs of both comparators 24 and 26.

Accordingly, if the terminal voltage of detonator 12 changes because of an accidental short or a disconnection originated from, for instance, impact sensor 20 or 22 or detonator 12 itself, the output from comparator 24 will become low when the terminal voltage of detonator 12 rises above a reference and the output from comparator 26 will become low when the terminal voltage of detonator 12 drops below a reference, causing AND gate circuit 38 to assume a low output and alarm lamp 36 to light. Thus trouble can be detected.

Suppose, however, a large load is suddenly applied to main power supply 18 such as occurs when the engine is started or the head lamps are lit. This causes the terminal voltage of main power supply 18 to drop instantly, whereas the terminal voltages of auxiliary power supply 32 and detonator 12 drop slowly due to capacitor C as shown in FIGS. 2(A) and 2(B). For this reason, as shown in FIGS. 2(C) and 2(D), the terminal voltage of detonator 12 becomes well over the reference input of comparator 24 which changes as sharply as the terminal voltage of main power supply 18, causing alarm lamp 36 to light during the period shown by ΔT in FIG. 2(B). In other words, the problem is that a false alarm is given. In addition, a similar problem occurs with respect to comparator 26 when the voltage of main power supply 18 is abruptly increased.

SUMMARY OF THE INVENTION

In view of the foregoing, it is therefore an object of the present invention to solve the aforementioned problems.

According to the present invention, a detecting device has a characteristic which changes on sensing a predetermined condition. This causes an actuating circuit to be powered by an auxiliary power supply. The auxiliary power supply is charged by a main power supply through unidirectional energizing elements. A trouble detecting circuit detects any malfunction of the actuating circuit by comparing a voltage directly related to the auxiliary supply voltage, not the main power supply voltage as in the prior art, with a voltage associated with the actuating circuit.

As in the preferred embodiment, the detecting device may be an impact sensor and the actuating circuit may be a detonator for a gas producing device which can fill a gas bag.

According to the present invention, any malfunction of the detonator circuit can be detected correctly, irrespective of changes in main supply voltage by connecting the auxiliary power supply, charged by the main power supply through the unidirectional energizing elements, to the detector circuit for providing a closed circuit and by comparing a voltage obtained from the auxiliary supply voltage with the terminal voltage of the detonator.

BRIEF DESCRIPTION OF THE DRAWINGS

These and other objects and advantages of this invention will become more apparent and more readily appreciated from the following detailed description of the presently preferred exemplary embodiment, taken in conjunction with the accompanying drawings, of which:

FIG. 1 is a schematic circuit configuration illustrating a prior art triggering device;

FIGS. 2(A)-2(D) are waveforms useful in gaining an understanding of the device of FIG. 1;

FIG. 3 is a schematic circuit configuration illustrating an embodiment of the vehicle-mounted triggering device according to the present invention; and FIGS. 4(A)-4(D) are waveforms useful in gaining an understanding of the embodiment of FIG. 3.

DETAILED DESCRIPTION OF THE PRESENTLY PREFERRED EXEMPLARY EMBODIMENT

Referring now to FIGS. 3 and 4(A)-4(D), an embodiment of the present invention will be described. In FIG. 3, elements corresponding to elements in FIG. 1 will be referenced with the same numerals as the corresponding elements in FIG. 1.

Vehicle-mounted triggering device 40 in FIG. 3, is the same as device 10 in FIG. 1 except that divider resistance circuit 34 is connected, with detonator circuit 30, across the positive and negative terminals of auxiliary power supply 32 instead of across main power supply 18. In other words, an important difference of the present invention from the conventional vehicle-mount triggering device lies in the fact that reference inputs to comparators 24 and 26 in trouble detecting circuit 28 are not formed by dividing the voltage of main supply 18 but the voltage of auxiliary supply 32.

Accordingly, detonator circuit 30 and trouble detecting circuit 28 are subject to a common influence relative to auxiliary power supply 32. As a result, changes in the voltage of main supply 18, which may, for instance, be caused by an excessive load applied to main power supply 18 when the engine is started or the head lamps are lit (shown in FIG. 4(A)) will not particularly affect trouble detecting circuit 28 alone. Assuming that even such a change in the voltage of supply 18 causes the terminal voltage of auxiliary power supply 32 to drop as capacitor C discharges, changes in the voltage of auxiliary supply 32 will uniformly affect detonator circuit 30 and divider resistance circuit 34 as shown in FIGS. 4(B)-4(D). Consequently, it is possible to ensure the prevention of any false alarms caused by changing supply voltages when no malfunction exists with detonator circuit 30.

Since the voltage used as references by trouble detecting circuit 28 in vehicle-mounted triggering device 40 (FIG. 3) are formed by dividing the voltage of auxiliary supply 32, such a triggering device 40 does not generate false alarms as does the conventional vehicle-mounted triggering device 10 employing the method of dividing the voltage of main supply 18. Moreover, as changes in the voltage of auxiliary supply 32 uniformly affect trouble detecting circuit 28 and detonator circuit 30 in the embodiment of FIG. 3, only malfunctions of detonator circuit 30 are detected, so that the detonator 12 may be operated to set off explosive without fail when an impact occurs.

It should be apparent from the above that the present invention manifests its outstanding effects in that, as voltages used by the trouble detecting circuit as comparison references are formed by dividing the same source voltage as is used to energize a detonator circuit, the triggering device according to the present invention does not generate false malfunction alarms due to variations in main power voltages, which is often the case with conventional vehicle-mounted triggering devices, which divide the main supply voltage to obtain comparison reference voltages.

Although only one embodiment of this invention has been described in detail above, those skilled in the art will realize that many modifications are possible within the spirit and teaching of this invention. For example, the triggering circuitry may be employed to trigger many other events than the filling of a protective gas bag.

Accordingly all such modifications are intended to be included within the scope of the following claims.

What is claimed is:

1. A vehicle-mounted triggering device comprising:
   detecting means, mounted on said vehicle, for generating a detection signal in response to detection of a predetermined condition of said vehicle;
   an actuating circuit responsive to said detection signal;
   an auxiliary power supply, coupled to a primary power supply and to said detecting means and said actuating circuit, for providing a voltage to said detecting means and said actuating circuit;
   unidirectional energizing means for charging said auxiliary power supply from said primary power supply; and
   trouble detecting means for comparing a voltage associated with said actuating circuit with a reference voltage directly related to said voltage of said auxiliary power supply and generating an alarm in response to a predetermined comparison.

2. A device as in claim 1 wherein said detecting means includes means for detecting when said vehicle impacts another object.

3. A device as in claim 2 wherein said actuating circuit includes a detonator for producing gas to fill a protective gas bag.

4. A device as in claim 1 wherein said auxiliary power supply includes a capacitor for storing charge provided through said unidirectional energizing means.

5. A device as in claim 1 wherein said unidirectional energizing means includes at least one diode for passing current to said auxiliary power supply.

6. A device as in claim 1 wherein:
   said detecting means includes means for passing a first current through said actuating circuit when said detecting means does not detect said predetermined condition and for passing a second current through said actuating circuit when said detecting means detects said predetermined condition; and
   said trouble detecting means includes means for comparing a voltage related to said first current with said reference voltage.

7. A device as in claim 6 wherein said trouble detecting means includes:
   a first comparator for comparing said voltage related to said first current to a first reference voltage directly related to said auxiliary power supply voltage;
   a second comparator for comparing said voltage associated with said first current with a second reference voltage diretly related to said auxiliary power supply voltage; and
   means for generating an alarm when said voltage related to said first current is not between said first and second reference voltages.

8. A method of operating a vehicle-mounted triggering device to prevent false malfunction alarms comprising the steps of:
- detecting for a predetermined condition of said vehicle;
- powering an actuating circuit from an auxiliary power supply voltage in response to said detecting step;
- undirectionally charging said auxiliary power supply from a primary power supply;
- comparing a voltage associated with said actuating circuit with said auxiliary power supply voltage; and
- generating an alarm in response to a predetermined comparison by said comparing step, said triggering device generating said alarm in response to malfunction of said actuating circuit and not in response to any change in a voltage charging said auxiliary power supply in said unidirectional charging step.

9. A method as in claim 8 wherein said detecting step includes the step of detecting the impact of said vehicle with another object.

10. A method as in claim 9 wherein said powering step includes the step of energizing a detonator to cause the filling of a gas bag with gas.

11. A method as in claim 8 wherein:
- said powering step includes the steps of passing a first current through said actuating circuit when said predetermined condition is not detected and a second step of passing a second current through said actuating circuit when said predetermined condition is detected; and
- said comparing step includes the step of comparing a voltage related to said first current with a voltage related to said auxiliary power supply voltage.

* * * * *